(12) United States Patent
Liang (10) Patent No.: US 12,313,396 B2
(45) Date of Patent: May 27, 2025

(54) FREEFORM SURFACE METROLOGY AND DEFLECTOMETRY

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 214 days.

(21) Appl. No.: 18/002,397

(22) PCT Filed: Jun. 16, 2021

(86) PCT No.: PCT/US2021/037674
§ 371 (c)(1),
(2) Date: Dec. 19, 2022

(87) PCT Pub. No.: WO2021/257734
PCT Pub. Date: Dec. 23, 2021

(65) Prior Publication Data
US 2023/0228563 A1    Jul. 20, 2023

Related U.S. Application Data

(60) Provisional application No. 63/041,069, filed on Jun. 18, 2020.

(51) Int. Cl.
*G01B 11/25* (2006.01)
(52) U.S. Cl.
CPC .................................. *G01B 11/25* (2013.01)
(58) Field of Classification Search
CPC ..... G01B 11/25; G01B 11/24; G01B 11/2545; G01M 11/005; G01N 2021/8829
See application file for complete search history.

(56) References Cited

U.S. PATENT DOCUMENTS 9,470,641 B1 * 10/2016 Addington ........... G01N 21/958
2018/0058977 A1   3/2018 Trumm et al.
(Continued)

FOREIGN PATENT DOCUMENTS

CN       109357632 A  *  2/2019  ............ G01B 11/24
DE    112014001391 T5    12/2015
(Continued)

OTHER PUBLICATIONS

Niu Z, 3D shape measurement of discontinuous specular objects based on advanced PMD with bi-telecentric lens, Optics Express vol. 26 Issue 2, pp. 1615-1632 (Year: 2018).*

(Continued)

*Primary Examiner* — Uzma Alam
*Assistant Examiner* — Justin J Van Cleave
(74) *Attorney, Agent, or Firm* — Perkins Coie (57) ABSTRACT

Methods, devices and systems describe compact and simple deflectometry configurations that can measure complex shapes of freeform surfaces. One deflectometry system includes a first panel and a second panel positioned at an offset position from each other to provide illumination for an object. The second panel, positioned closer to the object, is operable as a substantially transparent panel, and as a pixelated panel to provide structured light patterns. The system also includes two or more cameras positioned on the second panel an is operable in a first mode where the first panel provides a first structured illumination and the second panel is configured as a substantially transparent panel that allows the first structured illumination from the first panel to transmit toward the object. The system is also operable in a second mode where the second panel is configured to provide a second structured illumination for illuminating the object.

24 Claims, 10 Drawing Sheets

(56) References Cited

U.S. PATENT DOCUMENTS

| | | | |
|---|---|---|---|
| 2019/0170507 A1 | 6/2019 | Grauzinis et al. | |
| 2019/0265026 A1 | 8/2019 | Zweckinger et al. | |
| 2019/0316898 A1 | 10/2019 | Kim et al. | |
| 2019/0385319 A1 | 12/2019 | Trenholm et al. | |

FOREIGN PATENT DOCUMENTS

| | | | | |
|---|---|---|---|---|
| WO | 2010069409 A1 | 6/2010 | | |
| WO | WO-2013060524 A2 * | 5/2013 | ............. | G01B 11/25 |
| WO | 2020176394 A1 | 9/2020 | | |

OTHER PUBLICATIONS

Blalock, Todd, "Aspheres: Finding the right tool: metrology for the manufacture of freeform optics," Laser Focus World, 2018.

Graves, L. R., et al., "Infinite deflectometry enabling 2π-steradian measurement range," vol. 27, No. 5 | Mar. 4, 2019, Optics Express pp. 7602-7615.

Graves, Logan R., "Model-free deflectometry for freeform optics measurement using an iterative reconstruction technique," vol. 43, No. 9, 2018, Optics Letters pp. 2110-2113.

International Search Report and Written Opinion mailed Sep. 24, 2021 for International Patent Application No. PCT/US2021/037674 (15 pages).

Knauer, Markus, et al., "Phase measuring deflectometry: a new approach to measure specular free-form surfaces," Optical Metrology in Production Engineering, Proc. of SPIE vol. 5457, 2004.

Krey, Stefan, et al., "A fast optical scanning deflectometer for measuring the topography of large silicon wafers," Proceedings of SPIE, vol. 5523, pp. 109-120.

Kus, Abdil, "Implementation of 3D Optical Scanning Technology for Automotive Applications," Sensors 2009, 9, 1967-1979.

Li, Chen, et al., "Phase measurement deflectometry with refraction model and its calibration," Optics Express vol. 26, No. 26, pp. 33510-33522, 2018.

Liu, Yue, et al., "Full-field 3D shape measurement of discontinuous specular objects by direct phase measuring deflectometry," Scientific Reports, 7, 10293, pp. 1-8, 2017.

Maldonado, Alejandro V., et al., "Development of a portable deflectometry system for high spatial resolution surface measurements," Applied Optics vol. 53, No. 18, pp. 4023-4032, 2014.

Niu, Zhenqui, et al., "3D shape measurement of discontinuous specular objects based on advanced PMD with bi-telecentric lens," vol. 26, No. 2 | Jan. 22, 2018, Optics Express pp. 1615-132.

Wang, Daodang, et al., "Computer-aided high-accuracy testing of reflective surface with reverse Hartmann test," vol. 24, No. 17 | Aug. 22, 2016, Optics Express pp. 19671-19681.

* cited by examiner

FREEFORM SURFACE METROLOGY AND DEFLECTOMETRY

CROSS-REFERENCE TO RELATED APPLICATION(S)

This patent document is a 371 National Phase Application of International Patent Application No. PCT/US2021/037674, filed Jun. 16, 2021, which claims priority to the provisional application with Ser. No. 63/041,069 titled "FREEFORM SURFACE METROLOGY AND DEFLECTOMETRY," filed Jun. 18, 2020. The entire contents of the above noted applications are incorporated by reference as part of the disclosure of this document.

STATEMENT REGARDING FEDERALLY SPONSORED RESEARCH

This invention was made with government support under Grant No. 1918260, awarded by NSF. The government has certain rights in the invention.

TECHNICAL FIELD

This patent document generally relates to metrology, and in particular, to methods devices and systems for measuring characteristics of an object under test using deflectometry.

BACKGROUND

The development of optical design and fabrication has placed ultrahigh requirement on the precision of measurement tools. Interferometers, such as Fizeau interferometer, Twyman-Green interferometer and point-diffraction interferometer, have been widely applied as a powerful noncontact testing method. The accuracy of interferometric methods can reach the order of nanometers and even subnanometers, however, its dynamic range is quite small. Besides, interferometric testing places high requirements on the design, fabrication and adjustment of optics in the system, which makes it costly and inflexible.

Deflectometry has been used as an alternative to measure specular surfaces such as car body parts and progressive eyeglasses, but current deflectometry techniques have several limitations including, for example, their inability to measure discontinuous surfaces.

SUMMARY

The disclosed embodiments describe methods, devices and systems related to compact and simple deflectometry configurations that can measure complex shapes of freeform surfaces that may include discontinuous surfaces.

One aspect of the disclosed embodiments relates to a deflectometry system that includes a first panel positioned at a first position to provide illumination to an object, the first panel operable to provide at least structured illumination, and a second panel positioned at a second position, offset from the first position, between the first panel and a position of the object. The second panel is operable as: (a) a substantially transparent panel, and (b) a pixelated panel to provide structured light patterns for illumination of the object. The deflectometry system also includes two or more cameras positioned on the second panel; the two or more cameras are positioned to receive reflected light from the object. The above noted deflectometry system is operable in a first mode where the first panel is configured to provide a first structured illumination and the second panel is configured as a substantially transparent panel that allows the first structured illumination from the first panel to transmit therethrough toward the position of the object, and in a second mode where the second panel is configured to provide a second structured illumination for illuminating the object.

DETAILED DESCRIPTION

Deflectometry, a slope measurement method such as the Ronchi test and the Hartmann test, provides a feasible way for surface testing with high dynamic range. With the surface slope (derivative of surface sag), the surface under test can be reconstructed with spatial integration. Deflectometry has been used to measure specular surfaces such as car body parts and progressive eyeglasses.

Figure 1:
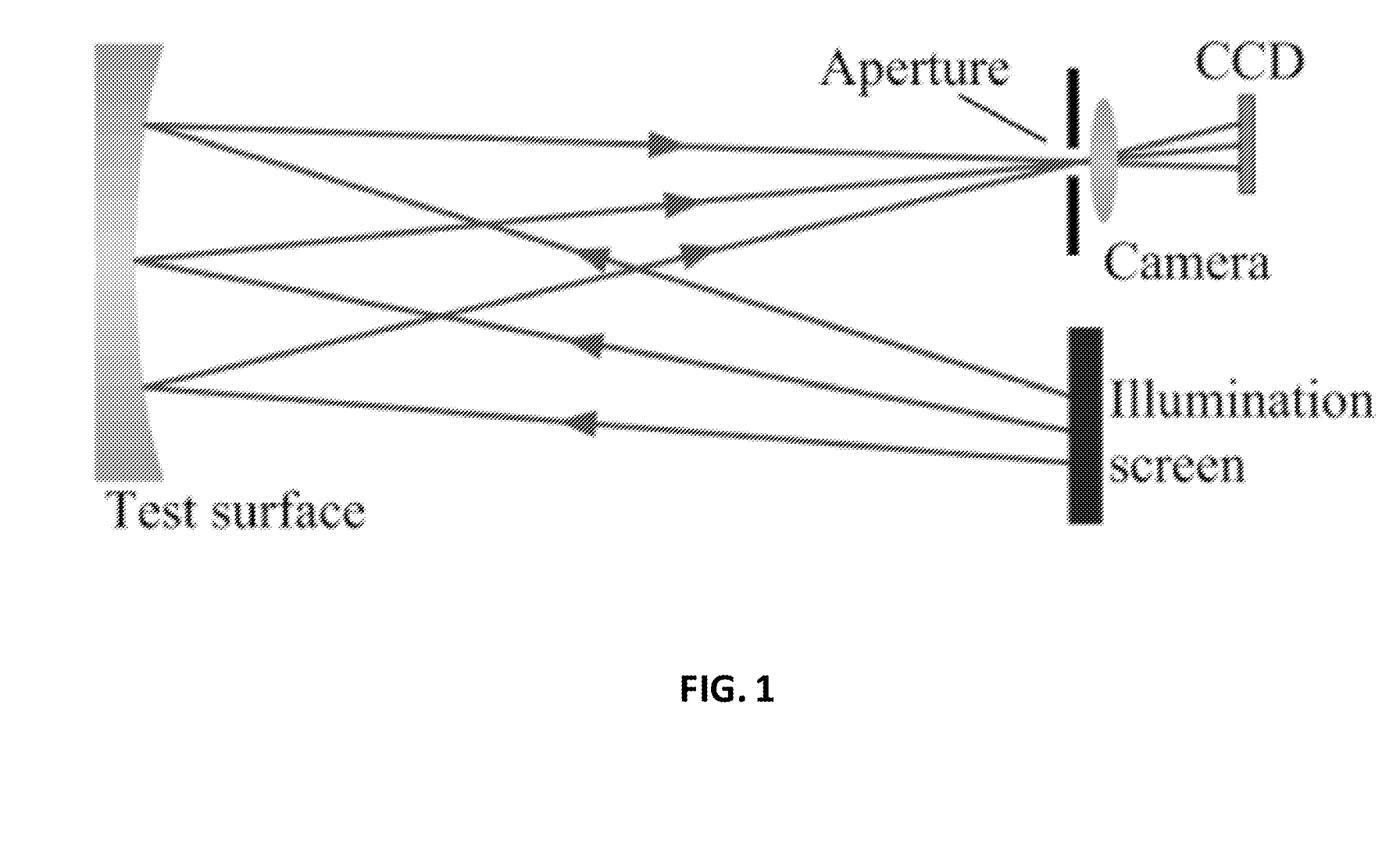
FIG. 1 illustrates an example phase measuring deflectometry (PMD) configuration.

Phase measuring deflectometry (PMD) has been widely studied to test specular freeform surfaces due to the advantages of non-contact and full-field measurement. FIG. 1 illustrates an example configuration of a PMD. A flat display plane is typically used as the illumination screen, and a digital sensor, such as CMOS or CCD camera, with a finite aperture size captures the image of the reflective surface under test. When a single pixel on the display is lit up, the image of the test surface on the digital sensor will show a bright region corresponding to a certain part on the test surface. According to the law of reflection, the incident ray and the corresponding reflected ray are uniquely defined by the illumination screen pixel, the center of camera aperture, and the part on the test surface that reflects the incident light. Based on triangulation, the local surface slopes ($w_x$ and $w_y$) of the test surface can be determined with the coordinates of these three points. The surface figure can be obtained from the integration of the slopes.

The one-to-one correspondence between the illumination screen pixel and the reflection region on the test surface can be determined by the sinusoidal fringe illumination and phase shifting method. The surface error under test, that is the departure from its ideal shape, can be measured according to the virtual "null" testing based on ray tracing. By ray tracing the test system with ideal test surface, in which the camera is modeled as an ideal point source and illumination screen as image plane, the ideal spot distribution ($x_{model}$ and $y_{model}$) corresponding to each individual ray defined by the sampling test surface can be obtained. In experimental setups, the actual spot distribution ($x_{actual}$ and $y_{actual}$) can be measured by the sinusoidal fringe phase shifting method. The system wavefront aberrations can be estimated from the transverse ray aberrations, according to the transverse ray model. The slopes ($w_x$ and $w_y$) can be obtained by dividing the spot coordinate differences ($\Delta x_{spot}$ and $\Delta y_{spot}$) with the distance $d_{m2s}$ between test surface and illumination screen. The slope differences ($\Delta w_x$, $\Delta w_y$) between the measured slope ($w_{x,actual}$ and $w_{y,actual}$) and the ideal slope ($w_{x,model}$ and $w_{y,model}$) can be determined by:

$$\begin{cases} \Delta w_x = w_{x,actual} - w_{x,model} = \frac{\partial W(x,y)}{\partial x} = \frac{\Delta x_{spot}}{2d_{m2s}} \\ \Delta w_y = w_{y,actual} - w_{y,model} = \frac{\partial W(x,y)}{\partial y} = \frac{\Delta y_{spot}}{2d_{m2s}} \end{cases}$$

where $W(x, y)$ is the wavefront aberration, $(x, y)$ are the exit pupil coordinates of the system; $\Delta x_{spot} = x_{actual} - x_{model}$, $\Delta y_{spot} = y_{actual} - y_{model}$. With surface integration, the test surface error can be calculated from the slope differences ($\Delta w_x$, $\Delta w_y$).

While PMD is simple and has a large measurement range, it has a number of limitations. In particular, PMD methods only measure the local slope of smooth surfaces, instead of the actual 3D shape. Thus, the shape of isolated and/or discontinuous surfaces cannot be directly calculated from the phase data. In addition, the absolute positions of the illumination light source, observation point, and test optics need to be measured with high accuracy in order to obtain a low uncertainty in slope calculation. Furthermore, it is relatively difficult to measure convex surfaces, partially because the camera is usually positioned at the side of the display panel, and some rays that are reflected from the test surface will not reach the camera.

Some methods have been developed in attempts to address the above limitations. For example, one technique to measure discontinuous surfaces makes two measurements with the display panel at different positions, either by moving one panel to a different location, or using a beam splitter to combine two panels (the effective distance from each panel to the test surface is different). The drawback of this technique is that the system is complicated and/or requires movement of the components.

The disclosed embodiments relate to a compact, simple deflectometry system, which overcome the shortcomings of prior systems and, among other features and benefits, can measure complex shapes of freeform surfaces that may include discontinuous surfaces.

Figure 2A:
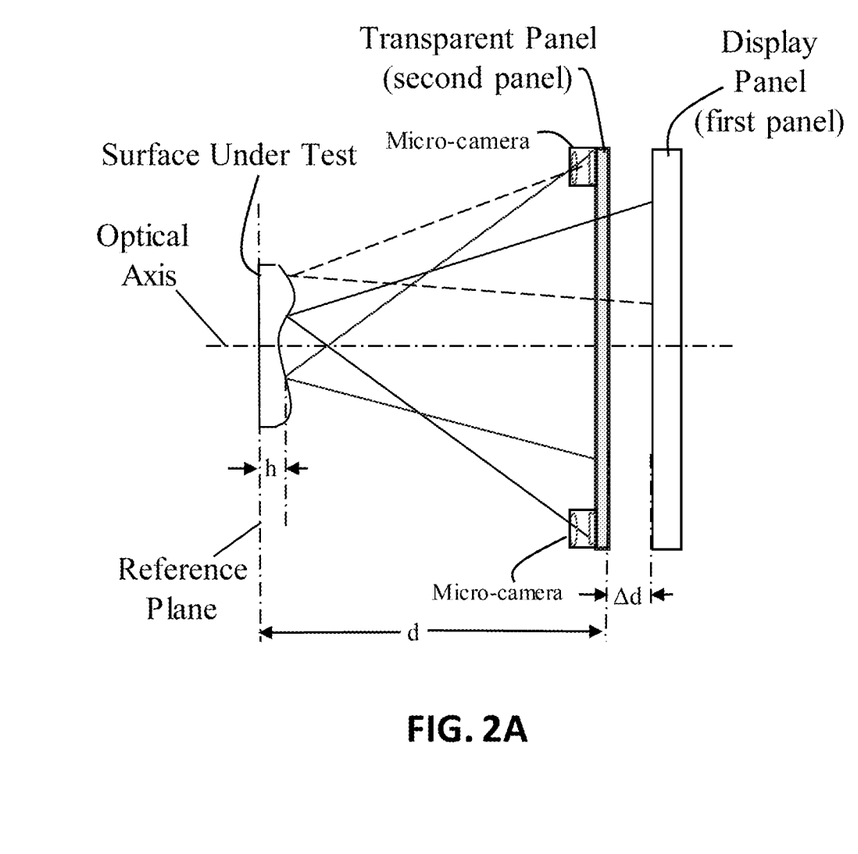
FIG. 2A illustrates a deflectometry system in accordance with an example embodiment.

FIG. 2A illustrates a deflectometry system in accordance with an example embodiment. The system includes two display panels and at least two micro-cameras. With more than one camera, the complex surface can be re-constructed from the measurements obtained from different cameras. With two display panels, the discontinuous surface can be measured accurately. In this configuration, the micro-cameras are placed at the edge of the panel. The first display panel (depicted in FIG. 2A as the Display Panel) is a high brightness panel, such as an LCD or OLED panel; the second panel is a transparent panel, such as an LCD, LED, or OLED panel that is at a distance, d, from the reference plane where the object under test is positioned. The high brightness panel is placed behind the transparent panel (at a distance $\Delta d$) so that it can be used as the backlight for the LCD transparent panel. The distance between two panels should be large enough to avoid Moiré effect which, in some cases, may be caused by the periodic structures in the transparent panel and the back screen, but not too large so that the system is compact enough. To measure the discontinuous surface, two measurements are needed. For the first measurement, light from the high brightness panel is transmitted as a structured pattern through the transparent panel, reflected from the surface under test, and then reaches one of the micro-cameras. For the second measurement, the high brightness panel works as a backlight (e.g., all pixels are turned on) for the LCD transparent panel. For LED and OLED transparent panels, the high brightness panel can be turned off as no backlight unit is needed for operating LED and OLED transparent panels. The light modulated by the structured pattern in the transparent panel will first reflect from the surface under test and then reach one of the micro-cameras. The structured pattern can be a sinusoidal fringe pattern. Since the relative position between the two panels is known, the surface shape can be calculated accurately with two measurements.

Figure 2B:
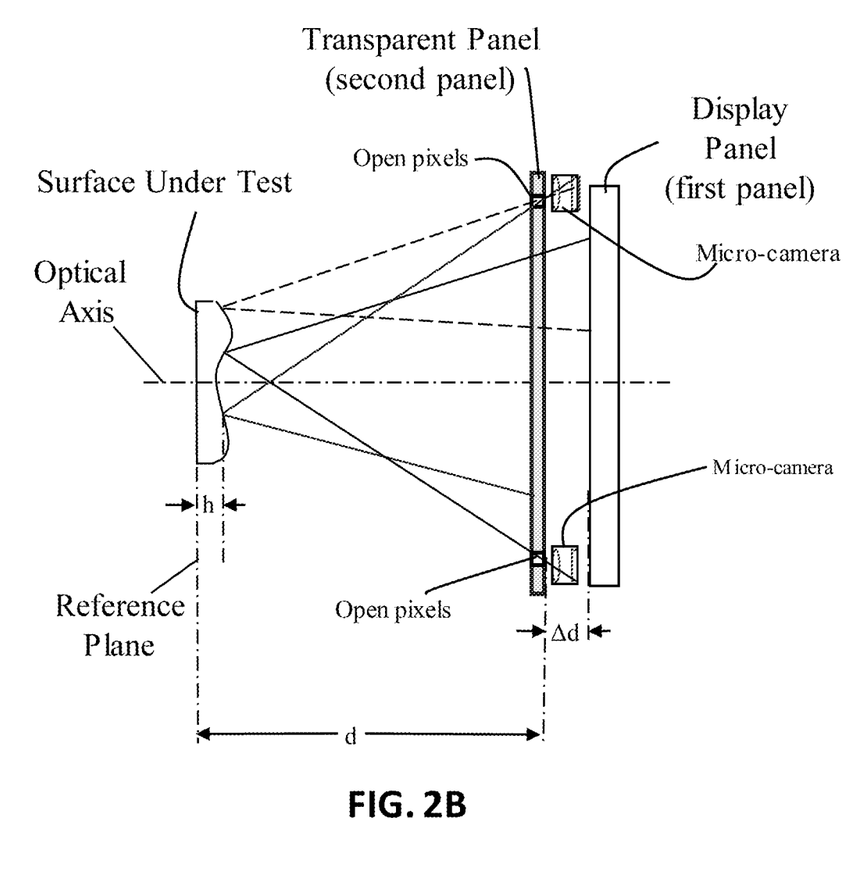
FIG. 2B illustrates a deflectometry system in accordance with another example embodiment.

FIG. 2B illustrates another embodiment where the micro-cameras are placed between the transparent panel (e.g., an LCD panel) and the display panel (e.g., a high brightness LCD, LED or OLED panel). A group of pixels in the transparent panel are configured to remain open, forming an aperture for the corresponding micro-camera behind the transparent panel. There are two key advantages in this embodiment. The first advantage is that the position of the micro-camera is known accurately relative to the transparent panel. The second advantage is that the aperture size is adjustable, which facilitates the calibration of the system and enables the measurement of surfaces under test with different and wider ranges of reflectivities.

Figure 3A:
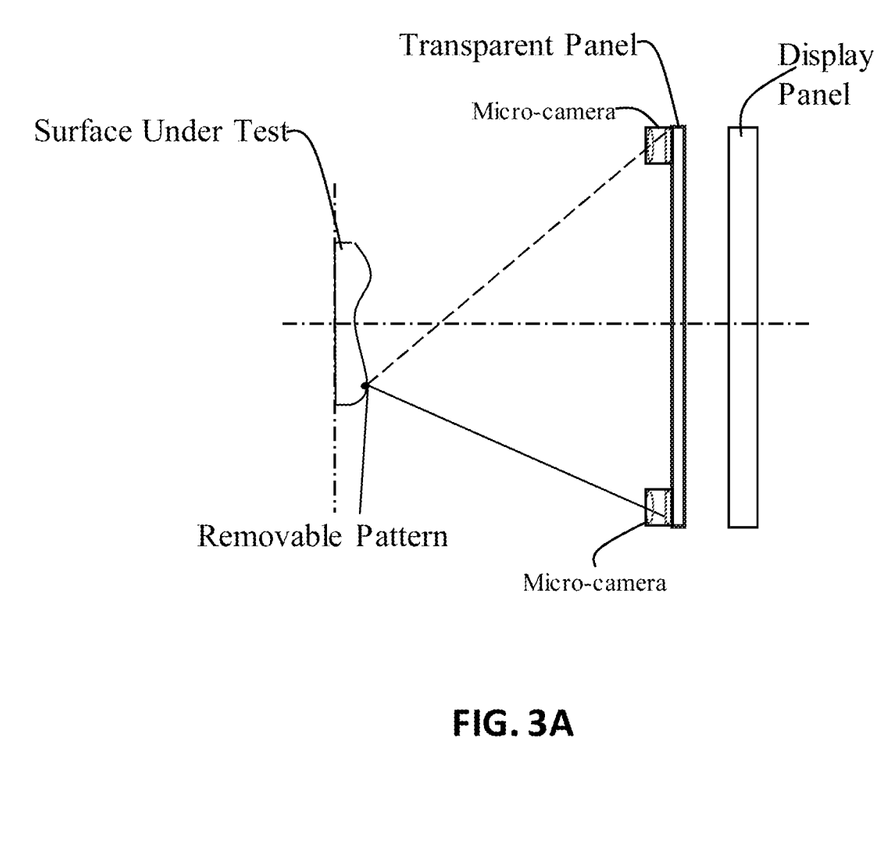
FIG. 3A illustrates a configuration for measuring the position of a surface under test in a deflectometry system in accordance with an example embodiment.
Figure 3B:
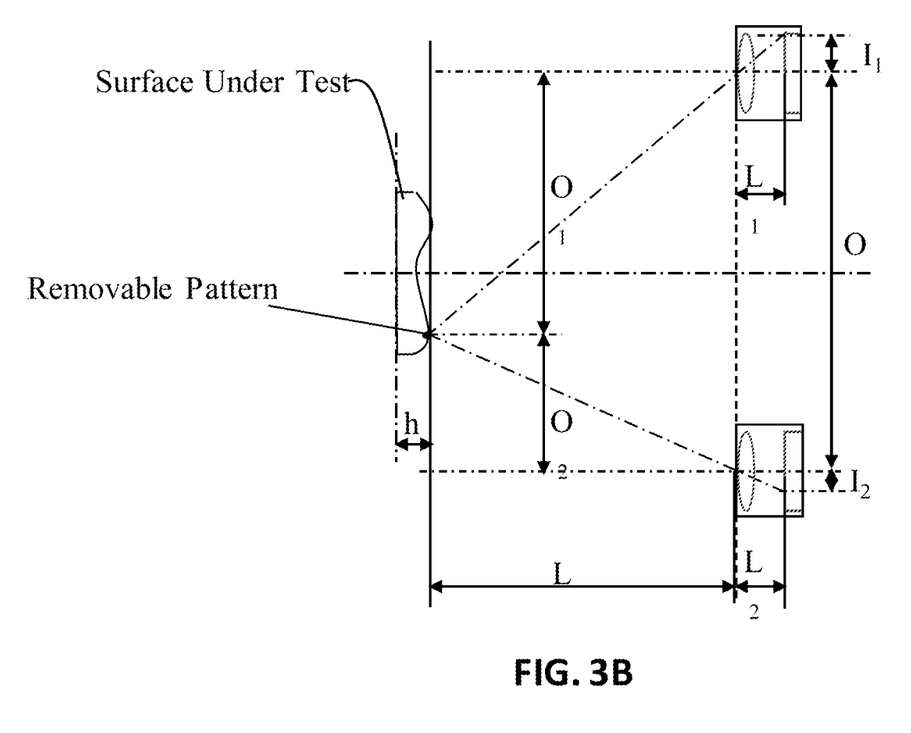
FIG. 3B illustrates the parameters for determining the distance between a surface under test and a camera in a deflectometry system in accordance with an example embodiment.

One critical requirement to achieve high performance measurement with PMD is accurate relative positioning of each component (display panel, camera, and surface under test). The positions of the cameras and display panels are fixed and thus their relative positions are known after calibration. The only variable is the position of the surface under test. In the disclosed configuration with multiple micro-cameras, the position of the surface under test can be directly measured with high accuracy. One approach is to place a small (e.g., removable) dot (or generally a pattern) on the surface, the position of which can be accurately calculated using the micro-camera as shown in FIG. 3A. The distance to the mark can then be used as a reference point to perform further computations of the surface shape without the requirement of performing a calibration operation to determine the position of multiple system components. In some embodiments, more than one dot may be placed on the surface of the object under test to improve the accuracy of distance measurements. In some embodiments, a pattern of marks can be placed on the object surface. For example, marks on a heat shrink film can be placed on the surface, or polymer marks can be formed on the surface of the object. FIG. 3B illustrates how the distance between the surface under test and the camera can be determined using two camera images. The parameters of both cameras (focal length $F_1$ and $F_2$, back focal distance $L_1$ and $L_2$) and the distance O between two cameras are known, and the image locations ($I_1$ and $I_2$) of the dot can be identified from the captured images, as well. Using two image formation equations of the two cameras and $O_1+O_2=O$, L, $O_1$, and $O_2$ can be calculated accurately.

Figure 4:
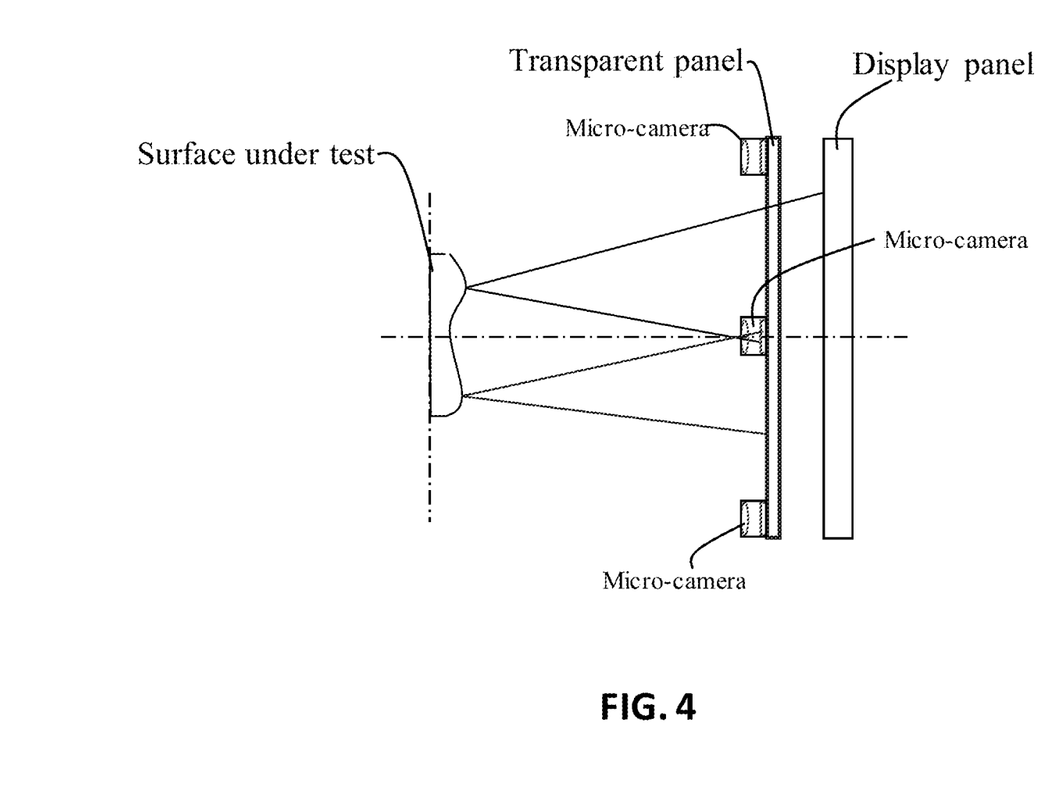
FIG. 4 illustrates a deflectometry system in accordance with another example embodiment.

FIG. 4 is another deflectometry system in accordance with an example embodiment. In the configuration of FIG. 4, one micro-camera is placed at the center of the second display panel. One advantage of this configuration is that one micro-camera (i.e., the center micro-camera) can be sufficient to measure a complex surface with a moderate slope, without stitching data from other cameras. One disadvantage is that the light from the center of the display panel is blocked by the center camera, and therefore a small part of the surface cannot be measured. However, in some applications, this limitation may be acceptable since the error is confined to within a small area of the object. Furthermore, by reducing the physical footprint of the camera, the amount of obstruction can be reduced. In another embodiment, the central micro-camera is augmented with one or more micro-cameras that are positioned at the edge of the second display panel. FIG. 4 illustrates the configuration with two additional micro-cameras at the edge of the second display panel. In such configurations, larger objects, objects that include more irregular surfaces and/or surface with higher slopes can be measured.

In some embodiments, the center camera can be positioned behind the transparent panel, in a similar configuration as the one shown in FIG. 2B, with the modification that center region of the transparent panel can also operate as an aperture to allow the center camera to receive the reflected light.

Figure 5:
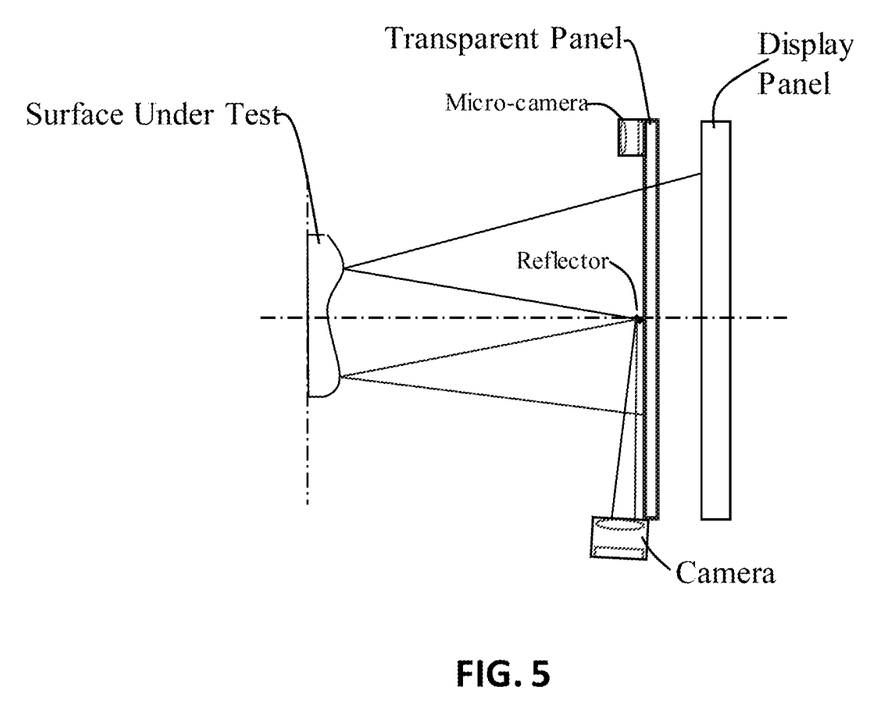
FIG. 5 illustrates a deflectometry system in accordance with yet another example embodiment that utilizes a reflector.

FIG. 5 illustrates an alternative configuration of a deflectometry system in accordance with an example embodiment. In this configuration, instead of placing a micro-camera at the center of the display panel, a very small reflector is used as an aperture that reflects the light to the camera that is positioned outside of the display panel. This configuration reduces the un-measured area of the object. In one example implementation, the reflector has a length and/or width dimension of about 1 mm. In some implementations, a relay lens may be positioned between the reflector and the micro-camera.

Figure 6:
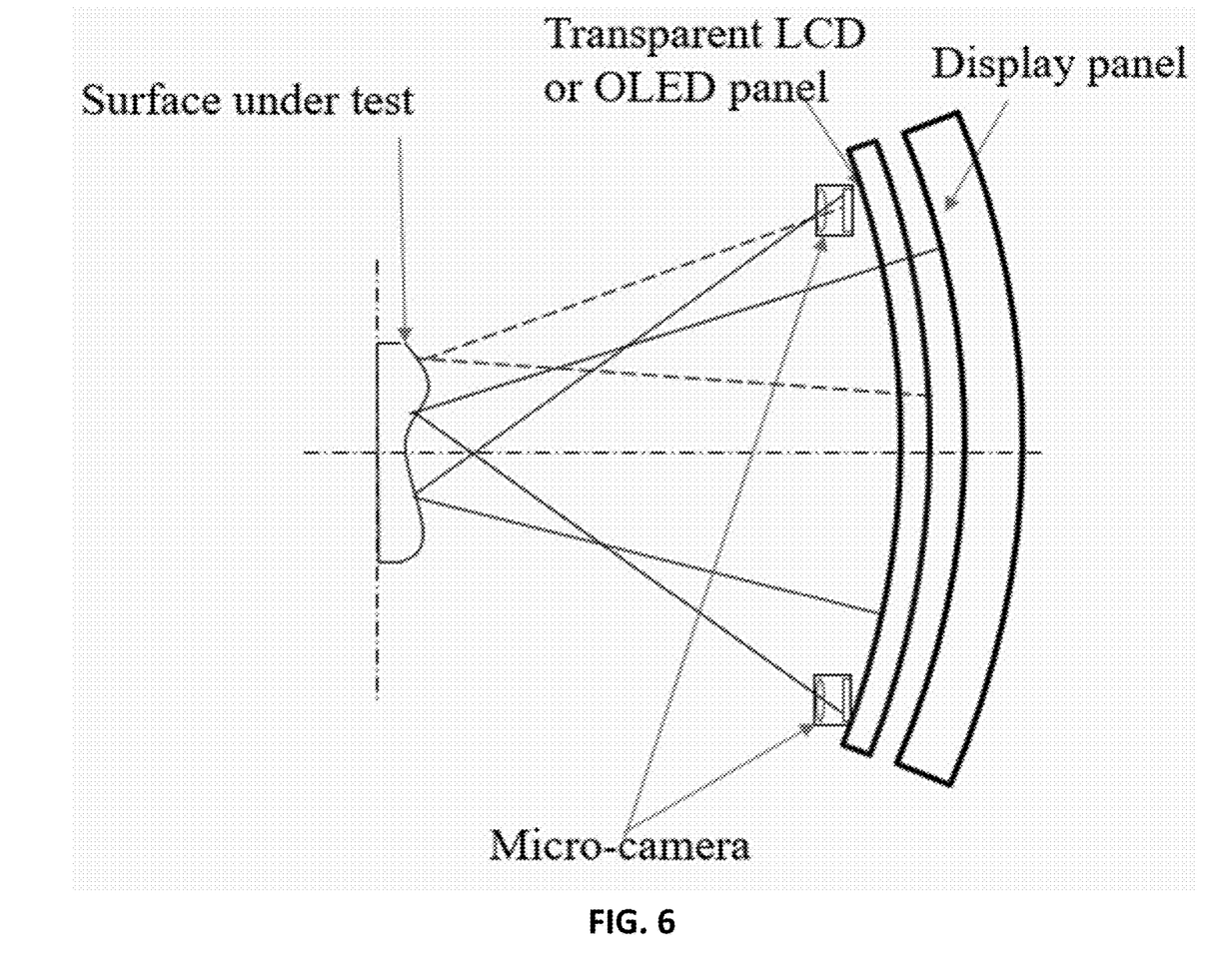
FIG. 6 illustrates a deflectometry system in accordance with another example embodiment that utilizes one or more curved panels.

FIG. 6 illustrates another deflectometry system in accordance with an example embodiment. In this configuration, to further increase the measurement range, the flat panels are replaced with curved panels. With the curved panels, convex surfaces under test with large slopes can be measured. The curved surfaces may, for example, have cylindrical or spherical shapes. FIG. 6 shows the configuration with two curved panels. In some implementations, the first display panel that also operates as the backlight for the transparent panel can be a flat panel.

All of the above configurations can be simplified with one panel (either flat or curved), but keeping the multiple camera. The lost function is the capability to make two measurement without movement (of the panel). But this capability can be mitigated in some applications, for example in on-machine metrology for diamond turning, the device already includes high precision moving mechanism on machine. The metrology system can be either mounted onto the slow-slide server or hung over the spinning chuck.

The disclosed embodiments provide low-cost and accurate deflectometry systems that enable the measurement of surfaces that include discontinuities. In some embodiments, objects under test may be measured without moving any components of the system. In some embodiments, by using marks positioned on the surface of the objects under test, distance between the object and micro-cameras can be measured without having to perform a full calibration operation. In some embodiments, the one or more curved panels may be used to improve measurement of objects having highly irregular shapes. In some embodiments, a single micro-camera can be used alone, or in combination of a reflector, to provide a reduced-cost deflectometry system.

Figure 7:
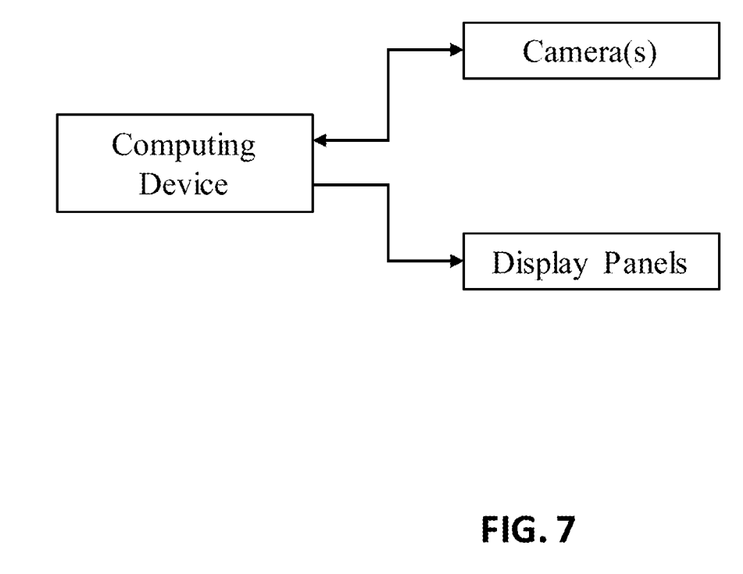
FIG. 7 is a block diagram illustrating some of the components of the disclosed deflectometry systems that are communication with one another.

FIG. 7 is a block diagram that illustrates some of the components of the disclosed embodiments that are communication with one another. A computing device is coupled to the cameras and to the display panels. The computing device may control the operations of the cameras and/or panels, and can receive information corresponding to the captured images from the cameras. The computing device may include at least one processor and/or controller, at least one memory unit that is in communication with the processor, and at least one communication unit that enables the exchange of data and information, directly or indirectly, through the communication link with the display panels, cameras, as well as databases and networks, as needed. Such processors, controllers, and the associated memory and communication unit can be incorporated as part of the computer. The communication unit may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The processor and memory may also be used to conduct computations to, for example, determine a surface shape and height information based on information associated with captured images. In some embodiments, at least one processor may be incorporated as part of one or more of the display panels, and/or the cameras.

Figure 8:
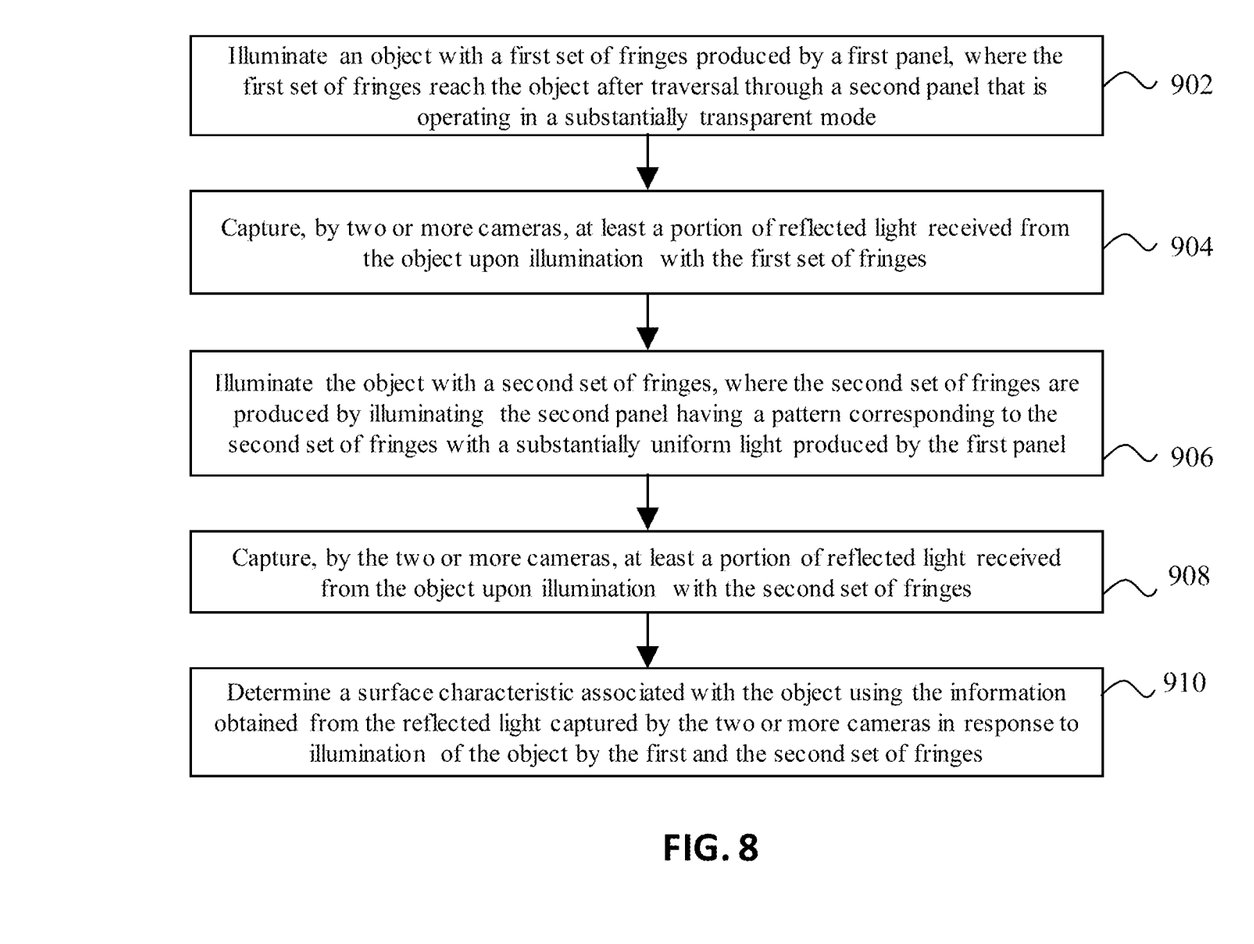
FIG. 8 illustrates a set of operations that can be carried out to determine a surface characteristic of an object in accordance with an example embodiment.

FIG. 8 illustrates a set of operations that can be carried out to determine a surface characteristic of an object in accordance with an example embodiment. At 802, an object is illuminated with a first set of fringes that are produced by a first panel; the first set of fringes reach the object after traversal through a second panel that is operating in a substantially transparent mode. At 804, upon illumination with the first set of fringes, at least a portion of reflected light received from the object is captured by two or more cameras. At 806, the object is illuminated with a second set of fringes, where the second set of fringes is produced by illuminating the second panel having a pattern corresponding to the second set of fringes with a substantially uniform light produced by the first panel. At 808, upon illumination with the second set of fringes, at least a portion of reflected light received from the object is captured by the two or more cameras. At 810, a surface characteristic associated with the object is determined using the information obtained from the reflected light captured by the two or more cameras in response to illumination of the object by the first and the second set of fringes.

In one example embodiment, the first and the second panels are positioned at a predetermined distance from each other. In another example embodiment, the surface characteristic includes a surface height associated with the object which is determined without reliance on computing any derivatives associated with first and second set of fringes. According to another example embodiment, prior to determining the surface height, the above noted operations include performing a distance measurement operation to determine a distance to a reference plane; the distance measurement operation includes placing a mark on a surface of the object, illuminating the object with light produced by the first panel, capturing reflected light from a surface region of the object where the mark is positioned, and determining a distance between the first or the second panel to the location of the mark based on information obtained from the captured reflected light.

One aspect of the disclosed embodiments relates to a deflectometry system that includes a first panel positioned at a first position to provide illumination to an object, the first panel operable to provide at least structured illumination, and a second panel positioned at a second position, offset from the first position, between the first panel and a position of the object. The second panel is operable as: (a) a substantially transparent panel, and (b) a pixelated panel to provide structured light patterns for illumination of the object. The deflectometry system also includes two or more cameras positioned to receive reflected light from the object. The cameras can be positioned on the second panel. The above noted deflectometry system is operable in a first mode where the first panel is configured to provide a first structured illumination and the second panel is configured as a substantially transparent panel that allows the first structured illumination from the first panel to transmit therethrough toward the position of the object, and in a second mode where the second panel is configured to provide a second structured illumination for illuminating the object. In the second mode of operation, the first panel can be configured to provide uniform illumination.

In one example embodiment, the two or more cameras include a first camera that is positioned on a periphery of the second panel, and a second camera that is positioned on the periphery of the second panel at a location opposite to a location of the first camera. In another example embodiment, the two or more cameras include a first camera that is positioned on a periphery of the second panel, and a second camera that is positioned at a center location of the second panel. In yet another example embodiment, the two or more cameras include a first camera that is positioned on a periphery of the second panel, a second camera that is positioned outside the periphery of the second panel, and a reflector positioned at a center location of the second panel to direct at least a portion of the reflected light from the object to the second camera. In one example embodiment, a distance between the first panel and the second panel is selected to avoid a Moiré effect.

According to another example embodiment, one or both of the first and the second panels is a curved panel. In one example embodiment, the deflectometry system is operable to project sinusoidal fringe patterns on the object in both the first and the second modes of operation. In another example embodiment, in the second mode of operation, the first panel is configured to provide backlight illumination and the second panel is configured to receive the backlight illumination from the first panel for providing the second structured light pattern for illumination of the object. For example, the second panel can be a liquid crystal display (LCD) panel. In still another example embodiment, in the second mode of operation, the first panel is configured to provide no illumination. In yet another example embodiment, the second panel is one of a light emitting diode (LED) panel or an organic light emitting diode OLED panel.

In another example embodiment, the first panel, the second panel, and the two or more cameras are fixed in position. According to another example embodiment, an optical axis of the deflectometry system passes through a center of the first panel and the second panel. In yet another example embodiment, both the first panel and the second panel are flat panels and are positioned substantially parallel to each other. In some embodiments, the deflectometry system further includes a processor and a memory with instructions stored thereon; the instructions upon execution by the processor configure the processor to: receive information from the two or more cameras representative of measured reflected light intensity values associated with the first mode and the second mode of operation, and compute a surface height or a surface shape associated with the object based on the received information. In yet other example embodiments, the deflectometry system includes a processor and a memory with instructions stored thereupon, where the instructions upon execution by the processor configure the processor to operate the deflectometry system sequentially in the first mode of operation followed by the second mode of operation, or sequentially in the second mode of operation followed by the first mode of operation.

Another aspect of the disclosed embodiments relates to a deflectometry system that includes a first panel positioned at a first position to provide illumination to an object, where the first panel is operable to provide at least structured illumination. The deflectometry system also includes a second panel positioned at a second position, offset from the first position, between the first panel and a position of the object. The second panel operable as: (a) a substantially transparent panel, and (b) a pixelated panel to provide structured light patterns for illumination of the object. The deflectometry system also includes a camera positioned to capture light that is reflected from the object toward a center region of the second panel. The deflectometry system is operable in a first mode of operation where the first panel is configured to provide a first structured illumination and the second panel is configured as a substantially transparent panel that allows the structured illumination from the first panel to transmit therethrough toward the position of the object, and in a second mode of operation where the second panel is configured to provide a second structured illumination for illuminating the object.

In one example embodiment, a reflector is positioned on or close to a surface of the second panel at the center region to direct the light that is reflected from the object toward the center region of the second panel the camera that is positioned outside a periphery of the second panel. In another example embodiment, the deflectometry system further includes a relay lens positioned between the reflector and the camera. In yet another example embodiment, in the second mode of operation, the first panel is configured to provide backlight illumination and the second panel is configured to receive the backlight illumination from the first panel for providing the second structured light pattern for illumination of the object. In still another example embodiment, in the second mode of operation, the first panel is configured to provide no illumination.

Another aspect of the disclosed embodiments relates to another deflectometry system that includes a first panel positioned at a first position to provide illumination to an object, where the first panel is operable to provide at least structured illumination. The deflectometry system also includes a second panel positioned at a second position, offset from the first position, between the first panel and a position of the object. The second panel is operable as: (a) a substantially transparent panel, and (b) a pixelated panel to provide structured light patterns for illumination of the object; the second panel includes one or more pixelated regions operable as one or more apertures. The above noted deflectometry system also includes one or more cameras positioned behind the second panel and between the first and the second panels. The one or more cameras are positioned to receive reflected light from the object through the one or more pixelated regions of the second panel when operating as apertures. The deflectometry system is operable in a first mode where the first panel is configured to provide a first structured illumination and the second panel is configured as a substantially transparent panel that allows the first structured illumination from the first panel to transmit therethrough toward the position of the object, and in a second mode where the second panel is configured to provide a second structured illumination for illuminating the object and the one or more pixelated regions of the second panel operate as apertures.

At least parts of the disclosed embodiments that include modules and the functional operations can be implemented in digital electronic circuitry, or in computer software, firmware, or hardware. At least some of those embodiments or operations can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:
1. A deflectometry system, comprising:
   a first panel positioned at a first position to provide illumination to an object, the first panel operable to provide at least structured illumination;
   a second panel positioned at a second position, offset from the first position, between the first panel and a position of the object, the second panel operable as:
   (a) a substantially transparent panel, and
   (b) a pixelated panel to provide structured light patterns for illumination of the object; and
   two or more cameras positioned to receive reflected light from the object; wherein:
   the deflectometry system is operable in a first mode where the first panel is configured to provide a first structured illumination and the second panel is configured as a substantially transparent panel that allows the first structured illumination from the first panel to transmit therethrough toward the position of the object, and a second mode where the first panel is configured to provide uniform illumination and the second panel is configured to provide a second structured illumination for illuminating the object.

2. The deflectometry system of claim 1, wherein the two or more cameras comprise a first camera that is positioned on a periphery of the second panel, and a second camera that is positioned on the periphery of the second panel at a location opposite to a location of the first camera.

3. The deflectometry system of claim 1, wherein the two or more cameras comprise a first camera that is positioned on a periphery of the second panel, and a second camera that is positioned at a center location of the second panel.

4. The deflectometry system of claim 1, wherein the two or more cameras comprise a first camera that is positioned on a periphery of the second panel, a second camera that is positioned outside the periphery of the second panel, and a reflector positioned at a center location of the second panel to direct at least a portion of the reflected light from the object to the second camera.

5. The deflectometry system of claim 1, wherein one or both of the first and the second panels is a curved panel.

6. The deflectometry system of claim 1, wherein the deflectometry system is operable to project sinusoidal fringe patterns on the object in both the first and the second modes of operation.

7. The deflectometry system of claim 1, wherein a distance between the first panel and the second panel is selected to avoid a Moiré effect.

8. The deflectometry system of claim 1, wherein both the first panel and the second panel are flat panels and are positioned substantially parallel to each other.

9. The deflectometry system of claim 1, further comprising a processor and a memory with instructions stored thereupon, wherein the instructions upon execution by the processor configure the processor to:
receive information from the two or more cameras representative of measured reflected light intensity values associated with the first mode and the second mode of operation, and
compute a surface height or a surface shape associated with the object based on the received information.

10. The deflectometry system of claim 1, further comprising a processor and a memory with instructions stored thereupon, wherein the instructions upon execution by the processor configure the processor to operate the deflectometry system sequentially in the first mode of operation followed by the second mode of operation, or sequentially in the second mode of operation followed by the first mode of operation.

11. The deflectometry system of claim 1, wherein in the second mode of operation, the first panel is configured to provide backlight illumination and the second panel is configured to receive the backlight illumination from the first panel for providing the second structured light pattern for illumination of the object.

12. The deflectometry system of claim 11, wherein the second panel is a liquid crystal display (LCD) panel.

13. A deflectometry system, comprising:
a first panel positioned at a first position to provide illumination to an object, the first panel operable to provide at least structured illumination;
a second panel positioned at a second position, offset from the first position, between the first panel and a position of the object, the second panel operable as:
(a) a substantially transparent panel, and
(b) a pixelated panel to provide structured light patterns for illumination of the object;
the second panel further comprising one or more pixelated regions operable as one or more apertures; and
one or more cameras positioned behind the second panel and between the first and the second panels, the one or more cameras positioned to receive reflected light from the object through the one or more pixelated regions of the second panel when operating as apertures; wherein:
the deflectometry system is operable in a first mode where the first panel is configured to provide a first structured illumination and the second panel is configured as a substantially transparent panel that allows the first structured illumination from the first panel to transmit therethrough toward the position of the object, and a second mode where the second panel is configured to provide a second structured illumination for illuminating the object and the one or more pixelated regions of the second panel operate as apertures.

14. The deflectometry system of claim 13, wherein, in the second mode of operation, the first panel is configured to provide no illumination.

15. The deflectometry system of claim 14, wherein the second panel is one of a light emitting diode (LED) panel or an organic light emitting diode OLED panel.

16. A deflectometry system, comprising:
a first panel positioned at a first position to provide illumination to an object, the first panel operable to provide at least structured illumination;
a second panel positioned at a second position, offset from the first position, between the first panel and a position of the object, the second panel operable as:
(a) a substantially transparent panel, and
(b) a pixelated panel to provide structured light patterns for illumination of the object; and
a camera positioned to capture light that is reflected from the object toward a center region of the second panel, wherein:
the deflectometry system is operable in a first mode of operation where the first panel is configured to provide a first structured illumination and the second panel is configured as a substantially transparent panel that allows the structured illumination from the first panel to transmit therethrough toward the position of the object, and a second mode of operation where the second panel is configured to provide a second structured illumination for illuminating the object.

17. The deflectometry system of claim 16, wherein in the second mode of operation, the first panel is configured to provide backlight illumination and the second panel is configured to receive the backlight illumination from the first panel for providing the second structured light pattern for illumination of the object.

18. The deflectometry system of claim 16, wherein in the second mode of operation, the first panel is configured to provide no illumination.

19. The deflectometry of claim 16, comprising a reflector positioned on or close to a surface of the second panel at the center region to direct the light that is reflected from the object toward the center region of the second panel to the camera that is positioned outside a periphery of the second panel.

20. The deflectometry of claim 19, further comprising a relay lens positioned between the reflector and the camera.

21. A method for determination a surface characteristic of an object, comprising:
illuminating an object with a first set of fringes produced by a first panel, the first set of fringes reaching the object after traversal through a second panel that is operating in a substantially transparent mode;

capturing, by two or more cameras, at least a portion of reflected light received from the object upon illumination with the first set of fringes;

illuminating the object with a second set of fringes, the second set of fringes produced by illuminating the second panel having a pattern corresponding to the second set of fringes with a substantially uniform light produced by the first panel;

capturing, by the two or more cameras, at least a portion of reflected light received from the object upon illumination with the second set of fringes; and determining a surface characteristic associated with the object using information obtained from the reflected light captured by the two or more cameras in response to illumination of the object by the first and the second set of fringes.

22. The method of claim 21, wherein the first and the second panels are positioned at a predetermined distance from each other.

23. The method of claim 21, wherein the surface characteristic includes a surface height associated with the object which is determined without reliance on computing any derivatives associated with first and second set of fringes.

24. The method of claim 21, further comprising, prior to determining the surface height, performing a distance measurement operation to determine a distance to a reference plane, the distance measurement operation comprising:
    placing a mark on a surface of the object;
    illuminating the object with light produced by the first panel;
    capturing reflected light from a surface region of the object where the mark is positioned; and
    determining a distance between the first or the second panel to a location of the mark based on information obtained from the captured reflected light.

* * * * *